(12) United States Patent
Schubert et al.

(10) Patent No.: US 7,919,202 B2
(45) Date of Patent: Apr. 5, 2011

(54) NONAQUEOUS CELL WITH IMPROVED THERMOPLASTIC SEALING MEMBER

(75) Inventors: Mark A. Schubert, Brunswick, OH (US); Jack W. Marple, Avon, OH (US)

(73) Assignee: Eveready Battery Company, Inc., St. Louis, MO (US)

( * ) Notice: Subject to any disclaimer, the term of this patent is extended or adjusted under 35 U.S.C. 154(b) by 681 days.

(21) Appl. No.: 11/943,860

(22) Filed: Nov. 21, 2007

(65) Prior Publication Data

US 2008/0063925 A1    Mar. 13, 2008

Related U.S. Application Data

(63) Continuation of application No. 10/682,223, filed on Oct. 9, 2003.

(51) Int. Cl.
*H01M 2/12* (2006.01)
*H01M 10/34* (2006.01)
*H01M 2/36* (2006.01)
*H01M 2/00* (2006.01)
*H01M 2/08* (2006.01)

(52) U.S. Cl. ............... 429/53; 429/57; 429/72; 429/163; 429/174

(58) Field of Classification Search ............... 429/53, 429/57, 72, 163, 174
See application file for complete search history.

(56) References Cited

U.S. PATENT DOCUMENTS 3,873,369 A * 3/1975 Kamenski ............... 429/231.5
4,580,790 A * 4/1986 Doose ....................... 524/546

* cited by examiner

*Primary Examiner* — Helen O Conley
(74) *Attorney, Agent, or Firm* — Robert C. Baraona (57) ABSTRACT

An electrochemical battery cell with an aperture in the container or cell cover has the aperture sealed by an improved thermoplastic sealing member, which forms at least a part of the cell's pressure relief vent and is made from a material comprising a thermoplastic resin and more than 10 weight percent of a thermal-stabilizing filler, to provide an effective seal and a reliable pressure relief vent over a broad temperature range.

1 Claim, 2 Drawing Sheets

NONAQUEOUS CELL WITH IMPROVED THERMOPLASTIC SEALING MEMBER

This application is a continuation of and claims priority to pending U.S. application Ser. No. 10/682,223, filed Oct. 9, 2003.

BACKGROUND

This invention relates to an electrochemical battery cell with a nonaqueous organic solvent electrolyte and an improved thermoplastic sealing member.

Nonaqueous battery cells are cells that contain essentially no water. The cell electrode materials and electrolyte are carefully manufactured, dried and stored prior to cell manufacturing to maintain the amount of water in those components at typically no more than tens or hundreds of parts per million. Those manufacturing processes in which cell internal components are exposed to the air are generally performed in a dry box or a dry room. These measures are necessary because of the high reactivity of one or more of the cell ingredients with water. Organic compounds are often used as electrolyte solvents in nonaqueous cells. Examples of nonaqueous cells that contain such organic solvents include lithium and lithium ion cells, though other types of nonaqueous cells, containing other materials that are highly reactive with water are known.

Batteries containing nonaqueous cells are becoming increasingly popular as power sources for electronic devices. Though they are often more costly than common aqueous cells, nonaqueous cells can have many advantages because of the natures of materials used. These advantages include high energy density, high capacity at low temperatures, low weight and excellent shelf life over a broad range of temperatures. Many nonaqueous cells also have high electrode interfacial surface area designs that make them especially well suited for high power (including high current and low resistance) discharge, and the general trend in power requirements for electronic devices has been toward higher and higher power. Some of the types of devices for which high capacity on high power discharge is particularly important include photoflash devices (flash units and cameras with internal flash capability), digital still cameras, video cameras, personal digital assistant devices and portable computers.

The ability to withstand extreme temperature conditions, including thermal cycling and thermal shock between high and low temperatures, is becoming more important for nonaqueous cells, particularly lithium and lithium ion cells larger than button cells.

Requirements for lithium and lithium ion cells to tolerate extreme temperature conditions without seal degradation resulting in salting, leakage, excessive weight (electrolyte) loss, venting at low internal cell pressures and excessive capacity loss are increasing. This is true from the standpoint of both the severity of the conditions that the cells must tolerate and the number and types of applications for which such requirements are being set. Cells with thermoplastic seal members made according to the prior art are not able to meet all of these requirements in certain cell types, particularly cells with electrolyte solvents having low boiling points.

A wide variety of cell designs have been used for nonaqueous cells. The type of design is dependent in part on the size of the cell, the type of electrode and electrolyte materials used in the cell and the power requirements of the devices to be powered by the cell. Because the cathode/electrolyte materials are so reactive, the designs for large liquid cathode lithium cells (e.g., lithium-sulfur dioxide ($Li/SO_2$) and lithium-thionyl chloride ($Li/SOCl_2$)) often have housings in which metal components are hermetically welded, and glass seals are used to seal metal components that must be electrically insulated and to seal small apertures in the housings. These types of housings tend to be expensive due to the materials and the manufacturing processes and equipment required.

Other means can be used to seal the cells. Because of the relatively low cost and ease of manufacture, it can be desirable to use thermoplastic seal members between rigid housing components. For example, a thermoplastic gasket or grommet can be compressed between the inside top edge of the cell container (e.g., a steel can) and the periphery of the cover closing the open top of the can, forming a seal to keep the electrolyte within the cell housing and to keep water out.

A thermoplastic seal member can also be used to seal an aperture in the cell housing. For example, the thermoplastic seal member may be in the form of a plug sealing a small hole in the cell cover. Electrolyte may be dispensed into the cell after the cover has been assembled to the can. In another example, the plug may be a rigid material, such as a glass or metal ball, with a thermoplastic seal member in the form of a bushing between the inner surface of the aperture and the ball. In these examples, the thermoplastic plug or the ball and bushing may also function as a pressure relief vent for the cell.

Figure 1:
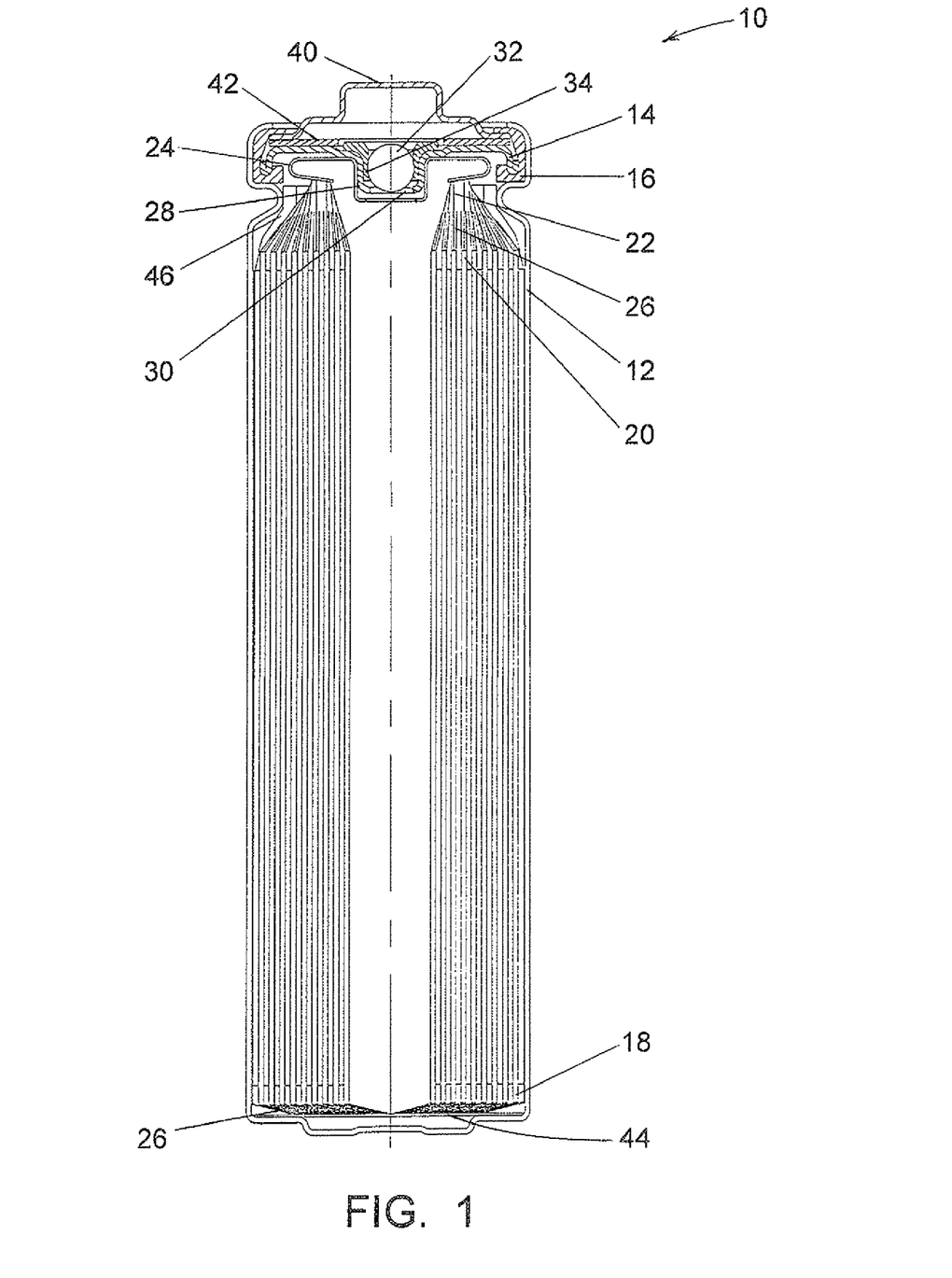
FIG. 1 is a cross-sectional view of a cylindrical electrochemical battery cell, with one thermoplastic seal member between the can and cover and another thermoplastic seal member between the cover and vent ball.

FIG. 1 shows an example of a cylindrical lithium cell design that has been used for $Li/FeS_2$ and other lithium cell types. It has two thermoplastic seal members—a gasket sealing a cover in the open end of the can and a bushing sealing an aperture in the cell cover. Both thermoplastic seal members provide a compressive seal. Since the can and cover are electrically connected to opposite electrodes within the cell, the gasket also provides the necessary electrical insulation. The bushing and a vent ball comprise a pressure relief vent for the cell. When the internal cell pressure exceeds a predetermined abnormally high level, the vent ball (or the ball and bushing) are forced out of the cover, leaving an opening through which pressure is released. Cells sealed with both a gasket between the can and cover and a pressure relief vent comprising a bushing and vent plug disposed in an aperture in the cell cover are disclosed in U.S. Pat. Nos. 4,329,405 (issued May 11, 1982), 4,437,231 (issued Mar. 20, 1984), 4,529,673 (issued Jul. 16, 1985), 4,592,970 (issued Jun. 3, 1986), 4,927,720 (issued May 22, 1990) and 4,931,368 (issued Jun. 5, 1990) and 5,015,542 (issued May 14, 1991), the entire disclosures of which are incorporated herein.

Thermoplastic seal members are also used in other types of cells, including aqueous electrolyte cells such as common consumer type aqueous zinc-manganese dioxide ($Zn/MnO_2$), nickel-cadmium (Ni/Cd) and nickel-metal hydride (NiMH) cells.

For any cell type, the seal member material and design must be such that a suitable seal is maintained for an acceptable period of time and under the temperature conditions that the cell is expected to withstand during transportation, storage and use. Common characteristics of a good seal member include stability of the material in the internal cell and external environments, impermeability to the liquids and gases that are to be sealed within or outside the cell, and the formation and maintenance of a complete seal path (i.e., with no voids or gaps) at each seal interface.

For thermoplastic seal members which form a compressive seal, the seal member must be sufficiently compressed to achieve a good seal, and sufficient compression must be maintained for the desired time. Thermoplastic materials under compressive stress tend to move to relieve that stress. This is referred to as stress relaxation or cold flow of the material. Thermoplastic materials tend to stress relax more at higher temperatures, thereby reducing the time that sufficient compression can be maintained. Temperature also affects the compression of thermoplastic seal members in another way. Different materials will expand and contract by different amounts in response to increases and decreases, respectively, in ambient temperature. In a cell with a thermoplastic seal member forming a compressive seal between more rigid components (e.g., a metal can and a metal cover), it is generally desirable for the gasket and rigid components being sealed to expand at close to the same rate in order to maintain sufficient gasket compression over the greatest temperature range possible.

Thermoplastic materials and seal designs suitable for nonaqueous cell seal members are more limited than for aqueous cell seal members. Because active materials in the cell are very reactive with water, the seal members must have a higher degree of impermeability to water, and some common materials for aqueous cell seal members are not suitable. Nonaqueous cell seal members must also have a low vapor transmission rate for the electrolyte solvents. Since the vapor transmission rate of thermoplastic material is generally dependent in part upon the vapor pressure of the solvent, low vapor transmission rates are generally more difficult to achieve for nonaqueous cells whose electrolytes contain ethers or other organic solvents with low boiling points. The greater the ratio of the effective cross sectional area of the seal member to the internal volume of the cell, the more important the electrolyte solvent and water transmission rates.

For use in some devices, such as those that may be used in automobile engine compartments and some outdoor environments, batteries must be capable of withstanding very high or very low temperatures. Electrochemical characteristics of some lithium and lithium ion cells make them desirable for use at such temperature extremes. However, seal members used in cells intended for such applications must be able to maintain an acceptable seal at those extreme temperatures. The importance of resistance to the effects of temperature extremes is becoming more important.

Polypropylene (PP) is commonly used a material for lithium cell (e.g., Li/MnO$_2$ and Li/FeS$_2$) gaskets. Gaskets have been made with other thermoplastic materials for the purpose of improving the ability of the cell to withstand high temperatures than with PP.

Sano et al. (U.S. Pat. No. 5,624,771) disclose the use of polyphenylene sulfide (PPS), rather than PP, as a gasket material for a lithium cell to improve resistance of the cell to high temperatures. PPS was used to reduce gasket deformation due to cold flow under the high load conditions the gasket was subjected to in the cell.

In U.S. Pat. No. 5,656,392, Sano et al. disclose thermoplastic synthetic resins, PPS and tetrafluoride-perfluoroalkyl vinylether copolymer (PFA), suitable for making a gasket for a cell that is useable at high temperatures and solves conventional problems caused by long-period use and/or storage. Also disclosed are the addition of a glass fiber filler to the resin to extend the stability of the gasket configuration and the addition of small amounts of polyethylene (PE) and/or polypropylene (PP) to extend the temperature range that can be tolerated by the cells on a cyclic thermal shock test. However, gaskets containing more than 10 weight percent glass fiber were undesirable because cells made with such highly filled thermoplastic materials leaked on a temperature cycling test. The addition of more than 10 weight percent of PE and/or PP was also undesirable because of cell leakage and a continuously usable temperature of less than 150° C. for the gasket.

Both U.S. Pat. No. 5,624,771 and U.S. Pat. No. 5,656,392 teach that high boiling point solvents such as γ-butyrolactone (boiling point 202° C.) and propylene carbonate (boiling point 241° C.) can be used as electrolyte solvents to achieve the desired high temperature cell performance and still maintain practical low temperature (−20° C.) cell operation in a Li/(CF)$_n$ coin cell. However, lithium cells with electrolytes containing a large amount of low boiling point solvents do not perform as well on high power discharge, which can be a disadvantage in larger cells intended for use in high power discharge applications.

In U.S. Pat. No. 6,025,091 Kondo et al. disclose a cell with a metal can sealed with a metal terminal cap and a gasket comprising polybutylene terephthalate (PBT). The gasket material can be PBT alone, PBT mixed with another polymer or PBT reinforced with inorganic materials such as glass fibers, glass beads and certain organic compounds. Kondo et al. disclose that the invention solves the problems of creeping and cracking of the gasket material when the cell is exposed to high temperature. The preferred cell type was a secondary cell, either with an alkaline or nonaqueous electrolyte (e.g., a lithium ion cell). A particularly preferred electrolyte contained LiCF$_3$SO$_3$, LiClO$_4$, LiBF$_4$ and/or LiPF$_6$ dissolved in a mixed solvent comprising propylene carbonate or ethylene carbonate and 1,2-dimethoxyethane and/or diethyl carbonate and 1,2-dimethoxyethane and/or diethyl carbonate.

In the mid-1980's Union Carbide Corp, also manufactured a ⅓ N size Li/MnO$_2$ cell (Type No. 2L76) with a gasket made from PBT (GAFITE® from GAF Chemicals). These cells had a spiral wound electrode design and contained an electrolyte with comprising a mixture of lithium perchlorate and lithium trifluoromethanesulfonate salts in a solvent containing 50 volume percent each of propylene carbonate and 1,2-dimethoxyethane.

The prior art teaches that the ability of cells to withstand a wide range of temperatures, especially high temperatures, can be improved by using gaskets made from materials that maintain dimensional stability and do not crack under extreme temperature conditions. The problem of reducing the rate of transmission of electrolyte solvent through the gasket is not addressed. This problem is generally greater at higher temperatures and with more volatile organic solvents with lower boiling points, such as ethers.

When a pressure relief vent for the cell is incorporated into the seal member, the characteristics of the thermoplastic seal member that affect the operation of the pressure relief vent must also be considered when selecting a suitable thermoplastic resin. Ethylene-tetrafluoroethylene copolymer (ETFE) is commonly used for vent bushings in consumer Li/FeS$_2$ cells with pressure relief vent designs similar to that in FIG. 1. When the internal cell pressure reaches a predetermined level, the vent ball or the vent ball and the vent bushing are forced outward to create an opening in the cell. When tested on a thermal shock test, the ETFE can sometimes undergo sufficient stress relaxation to cause a partial or complete loss of compression between the vent ball and cover or cause activation of the pressure relief vent undesirably low internal cell pressures.

Accordingly, battery cells with improved thermal tolerance characteristics, with little or no adverse effects on other cell characteristics, are desired. Therefore, an object of the present invention is to provide an economically made electrochemical battery cell, with a seal member made from one or more thermoplastic resins, having improved thermal tolerance characteristics. Another object of the invention is to provide a battery cell with a pressure relief vent comprising a thermoplastic seal member that has improved thermal tolerance characteristics.

SUMMARY

The above objects are met and the above disadvantages of the prior art are overcome by an electrochemical battery cell of the present invention.

It has been discovered that the seal effectiveness of a cell with a thermoplastic seal member that is a component of a pressure relief vent can be enhanced by including more than 10 weight percent of a thermal-stabilizing filler, such as glass fibers, in that seal member. The seal members can withstand compressive forces without fracturing, and electrolyte loss from the cell across a broad range of temperatures can be substantially reduced, even when the cell electrolyte contains a large amount of very volatile solvent. The seal member of the invention can be used to provide an excellent compressive seal for an aperture in the cell housing and also form at least a part of a reliable pressure relief vent for the cell.

Accordingly, in one aspect the present invention is directed to an electrochemical battery cell comprising a housing comprising a metal container with at least one open end and at least a first metal cover disposed in the at least one open end of the container, a positive electrode, a negative electrode, a separator disposed between the positive and negative electrodes, an electrolyte, and a first thermoplastic seal member sealing one of the at least one open end of the container and an aperture in the first cover. The first thermoplastic seal member comprises a thermoplastic resin and more than 10 weight percent of a thermal-stabilizing filler. The first thermoplastic seal member seals an aperture in at least one of the container and the first cover and the first cover and forms at least a part of a pressure relief vent for releasing a pressurized gas from the cell.

Another aspect of the present invention is an electrochemical battery cell comprising a housing comprising a metal container with at least one open end and at least a first metal cover disposed in the at least one open end of the container; a pressure relief vent; a positive electrode; a negative electrode comprising at least one member of the group consisting of lithium, a lithium alloy and a lithium intercalation compound; a separator disposed between the positive and negative electrodes; a nonaqueous electrolyte comprising an organic solvent; and a first thermoplastic seal member sealing an aperture in the first cover. The thermoplastic seal member is made from a material comprising at least one polymeric resin selected from the group consisting of ethylene-tetrafluoroethylene, polybutylene terephthalate, polyphenylene sulfide, polyphthalamide, ethylene-chlorotrifluoroethylene, chlorotrifluoroethylene, perfluoroalkoxyalkane, fluorinated perfluoroethylene polypropylene and polyetherether ketone, as well as more than 10 weight percent of a thermal-stabilizing filler, has a hollow cylindrical shape and cooperates with the first metal cover and a plug disposed within the thermoplastic seal member to form a compression seal for the aperture and to release pressurized gas from within the cell when a cell internal pressure exceeds a predetermined level.

In one embodiment of the invention the first thermoplastic seal member has a hollow cylindrical shape and is disposed within the aperture, with a plug disposed within the cylindrical seal member.

In another embodiment of the invention the first thermoplastic seal member is a plug.

These and other features, advantages and objects of the present invention will be further understood and appreciated by those skilled in the art by reference to the following specification, claims and appended drawings.

Unless otherwise specified, the following definitions and methods are used herein:
 aperture means an opening in a material that extends from an area within one surface to an area within an adjacent surface of the material; an open end of a container such as a can or a tube is not an aperture;
 coefficient of thermal expansion is determined in the flow direction between 50° C. and 90° C. according to ASTM E831 and expressed in percent×$10^{-5}$ per degree Celsius;
 heat deflection temperature is determined at 264 pounds per square inch (psi) [18.26 kg/cm$^2$] according to ASTM D648 and expressed in degrees C;
 mold shrinkage is determined on a ⅛ inch (3.175 mm) thick specimen according to ASTM D955 and expressed in (inches/inch)×$10^{-3}$ [(mm/mm)×$10^{-3}$];
 thermal-stabilizing filler is a material which, when added to a base resin, will decrease the resin's coefficient of thermal expansion by at least 20 percent and increase the heat deflection temperature by at least 20° C.;
 venting means the opening of the pressure relief vent of a cell; and
 vent pressure means the internal cell pressure at which the pressure relief vent opens to release pressure from the cell.

Unless otherwise specified herein, all disclosed characteristics and ranges are as determined at room temperature (20-25° C.), and boiling points are at one atmosphere pressure.

DESCRIPTION

The invention will be better understood with reference to FIG. 1, which shows an FR6 type cylindrical battery cell having a housing sealed by two thermoplastic seal members (a gasket and a vent bushing). Cell 10 has a housing that includes a can 12 with a closed bottom and an open top end that is closed with a cell cover 14 and a gasket 16. The can 12 has a bead or reduced diameter step near the top end to support the gasket 16 and cover 14. The gasket 16 is compressed between the can 12 and the cover 14 to seal an anode 18, a cathode 20 and electrolyte within the cell 10. The anode 18, cathode 20 and a separator 26 are spirally wound together into an electrode assembly. The cathode 20 has a metal current collector 22, which extends from the top end of the electrode assembly and is connected to the inner surface of the cover 14 with a contact spring 24. The anode 18 is electrically connected to the inner surface of the can 12 by a metal tab (not shown). An insulating cone 46 is located around the peripheral portion of the top of the electrode assembly to prevent the cathode current collector 22 from making contact with the can 12, and contact between the bottom edge of the cathode 20 and the bottom of the can 12 is prevented by the inward-folded extension of the separator 26 and an electrically insulating bottom disc 44 positioned in the bottom of the can 12. Cell 10 has a separate positive terminal cover 40, which is held in place by the inwardly crimped top edge of the can 12 and the gasket 16. The can 12 serves as the negative contact terminal. Disposed between the peripheral flange of the terminal cover 40 and the cell cover 14 is a positive temperature coefficient (PTC) device 42 that substantially limits the flow of current under abusive electrical conditions. Cell 10 also includes a pressure relief vent. The cell cover 14 has an aperture comprising an inward projecting central vent well 28 with a vent hole 30 in the bottom of the well 28. The aperture is sealed by a vent ball 32 and a thin-walled thermoplastic bushing 34, which is compressed between the vertical wall of the vent well 28 and the periphery of the vent ball 32. When the cell internal pressure exceeds a predetermined level, the vent ball 32, or both the ball 32 and bushing 34, are forced out of the aperture to release pressurized gases from the cell 10.

The materials used for cell components depend in part on the cell type, including the electrochemistry. For lithium and lithium ion cells, there are many similarities in suitable materials.

The vent bushing is a thermoplastic material that is resistant to cold flow at high temperatures (e.g., 75° C.). This can be achieved by including more than 10 weight percent, preferably at least 15 percent, thermal-stabilizing filler in the thermoplastic material. Preferably no more than 40, more preferably no more than 30, weight percent thermal-stabilizing filler is added. The base resin of the thermoplastic material is one that is compatible with the cell ingredients (anode, cathode and electrolyte). The resin can be formulated to provide the desired sealing, venting and processing characteristics. The resin is modified by adding a thermal-stabilizing filler to provide a vent bushing with the desired sealing and venting characteristics at high temperatures.

It is generally preferred that the wall of the vent bushing between the vent ball and the vent well in the cover be thin (e.g., 0.006 to 0.015 inch as manufactured) and be compressed by about 25 to 40 percent when the bushing and ball are inserted into the cover.

Suitable polymeric resins include ethylene-tetrafluoroethylene, polybutylene terephthalate, polyphenylene sulfide, polyphthalamide, ethylene-chlorotrifluoroethylene, chlorotrifluoroethylene, perfluoroalkoxyalkane, fluorinated perfluoroethylene polypropylene and polyetherether ketone. Ethylene-tetrafluoroethylene copolymer (ETFE), polyphenylene sulfide (PPS), polybutylene terephthalate (PBT) and polyphthalamide are preferred, especially for use in a cell with an electrolyte solvent containing a large percentage of highly volatile (high vapor pressure, low boiling point) ether compounds.

A suitable thermal-stabilizing filler is one which, when added to the thermoplastic resin, decreases the CTE of the resin by at least 20 percent and increases the HDT of the resin by at least 20° C. Such fillers may be inorganic materials, such as glass, clay, feldspar, graphite, mica, silica, talc and vermiculite, or they may be organic materials such as carbons. It may be advantageous for the filler particles to have a high average aspect ratio, such as fibers, whiskers, flakes and platelets.

Glass can be used as a thermal-stabilizing filler. A preferred type of glass is E-glass. The lengths of the glass fibers will affect the material properties to some extent, particularly the thermal and mechanical properties, more so than the thermal expansion. The fiber length can vary depending on the base resin use. For example, with PBT as the base resin, shorter fibers seem to work well, while with other base resins, longer fibers may be better. The glass fiber length can be controlled in any suitable manner. In general, milling produces shorter fibers than chopping.

The vent bushing can be manufactured using any suitable process. Injection molding is an example. Because the length of the glass fibers in the thermoplastic material can be reduced during injection molding of the vent bushings, the possible effects on the vent bushing characteristics should be considered before using reground scrap from molding. The molding parameters used should be those that provide a smooth surface on the molded bushings (e.g., Society of the Plastics Industry Standard Surface Finish D3 or better). Molding parameters will vary with the type of material being molded. For TEFZEL® HT2004 (ETFE resin with 25 weight percent chopped glass filler), a molding temperature of about 300° F. (149° C.) and a barrel temperature of about 680° F. (360° C.) has been found to work well with a fast (greater than about 2.5 in./sec. (6.35 cm/sec.)) injection rate. Additives, such as impact modifiers, may be used.

The mixture of base resin and filler used to make the vent bushing preferably has a heat deflection temperature (HDT) of at least 90° C. (preferably at least 150° C. and more preferably at least 190° C.) and a coefficient of thermal expansion (CTE) between 50 and 90° C. of no greater than $7.0 \times 10^{-5}$ (preferably no greater than $5.0 \times 10^{-5}$ and more preferably no greater than $3.0 \times 10^{-5}$) percent per ° C.

To maintain the desired compression of the bushing between the cover and vent ball, it is generally desirable to use materials for the vent bushing that have low coefficients of thermal expansion to minimize the effects of temperature. When the CTE is greater than $5.0 \times 10^{-5}$ percent per ° C., excessive overstress (resulting in excessive cold flow) can occur at high temperatures and excessive contraction can occur at low temperatures. Both of these undesirable conditions can result in insufficient compression in the vent bushing to provide a good seal against the cell cover and the vent ball, leading to loss of electrolyte from the cell, water ingress into the cell and opening of the pressure relief vent under normal storage and use conditions.

It is also preferable for the CTE's of the cell cover, vent ball and vent bushing to be close to one another so that dimensions of the cover, ball and bushing interface surfaces will change by about the same amount in response to temperature changes, thereby minimizing the effects on bushing compression over a broad temperature range.

The heat deflection temperature is a measure of the material's tendency to soften when subjected to heat. The higher the temperature, the more rigid the material remains when exposed to heat. When the HDT is too low the material can flow excessively at high temperatures, resulting in a loss of compression of the vent bushing between the cell cover and the vent ball.

The vapor transmission rates of water and the electrolyte solvent should also be low to minimize the entry of water into the cell and loss of electrolyte from the cell. Water in the cell can react with the active materials, and the internal resistance of the cell can increase to an undesirable level if too much electrolyte solvent is lost.

The cell container is often a metal can with an integral closed bottom, though a metal tube that is initially open at both ends may also be used instead of a can. The can is generally steel, plated with nickel on at least the outside to protect the outside of the can from corrosion. The type of plating can be varied to provide varying degrees of corrosion resistance or to provide the desired appearance. The type of steel will depend in part on the manner in which the container is formed. For drawn cans the steel can be a diffusion annealed, low carbon, aluminum killed, SAE 1006 or equivalent steel, with a grain size of ASTM 9 to 11 and equiaxed to slightly elongated grain shape. Other steels, such as stainless steels, can be used to meet special needs. For example, when the can is in electrical contact with the cathode, a stainless steel may be used for improved resistance to corrosion by the cathode and electrolyte.

The cell cover is typically metal. Nickel plated steel may be used, but a stainless steel is often desirable, especially when the cover is in electrical contact with the cathode. The complexity of the cover shape will also be a factor in material selection. The cell cover may have a simple shape, such as a thick, flat disk, or it may have a more complex shape, such as the cover shown in FIG. 1. When the cover has a complex shape like that in FIG. 1, a type 304 soft annealed stainless steel with ASTM 8-9 grain size may be used, to provide the desired corrosion resistance and ease of metal forming. Formed covers may also be plated, with nickel for example.

The terminal cover should have good resistance to corrosion by water in the ambient environment, good electrical conductivity and, when visible on consumer batteries, an attractive appearance. Terminal covers are often made from nickel plated cold rolled steel or steel that is nickel plated after the covers are formed. Where terminals are located over pressure relief vents, the terminal covers generally have one or more holes to facilitate cell venting.

The vent ball can be made from any suitable material that is stable in contact with the cell contents and provides the desired cell sealing and venting characteristic. Glasses or metals, such as stainless steel, can be used. The vent ball should be highly spherical and have a smooth surface finish with no imperfections, such as gouges, scratches or holes visible under 10 times magnification. The desired sphericity and surface finish depend in part on the ball diameter. For example, in one embodiment of a Li/FeS$_2$ cell, for balls about 0.090 inch (2.286 mm) in diameter the preferred maximum sphericity is 0.0001 inch (0.00254 mm) and the preferred surface finish is 3 microinches (0.0762 μm) RMS maximum. For balls about 0.063 inch (1.600 mm) in diameter, the preferred maximum sphericity is 0.000025 inch (0.000635 mm), and the preferred maximum surface finish is 2 microinches (0.0508 μm) RMS.

The gasket is a thermoplastic material containing a thermoplastic material. Any suitable thermoplastic material that provides the desired sealing properties may be used. Material selection is based in part on the anode, cathode and electrolyte compositions. Examples of suitable materials for nonaqueous cells include polypropylene, polyphenylene sulfide, tetrafluoride-perfluoroalkyl vinylether copolymer, polybutylene terephthalate and combinations thereof. Preferred gasket materials for Li/FeS$_2$ cells include polypropylene (e.g., PROFAX® 6524 from Basell Polyolefins, Wilmington, Del., USA), polybutylene terephthalate (e.g., CELANEX® PBT, grade 1600A from Ticona-US, Summit, N.J., USA) and polyphenylene sulfide (e.g., TECHTRON® PPS from Boedeker Plastics, Inc., Shiner, Tex., USA). Small amounts of other polymers, reinforcing inorganic fillers and/or organic compounds may also be added to the base resin of the gasket. When inorganic fillers are used, the total amount should be no more than 10 weight percent of the thermoplastic material.

In one embodiment of an FR6 Li/FeS$_2$ cell according to FIG. 1, the upstanding side wall of the gasket is 0.0205 inch (0.521 mm) thick as manufactured. The diameters of the cell cover, gasket and crimped can are such that the gasket is compressed by about 30 percent of its original thickness to provide a good seal. The gasket is preferably coated with a sealant to provide the best seal. Ethylene propylene diene terpolymer (EPDM) is a suitable sealant material, but other suitable materials can be used. The initial vent bushing wall thickness is 0.0115 inch (0.292 mm). It is compressed by about 30 to 35 percent of its original thickness in the sealed cell. A sealant could be used between the vent bushing and the cell cover or between the vent bushing and the vent ball, or a sealant could be applied over the cover, bushing and ball to improve the seal, but preferably no sealant is used in order to avoid adversely affecting cell venting or the vent pressure.

An anode for a lithium cell contains lithium metal, often in the form of a sheet or foil. The composition of the lithium can vary, though the purity is always high. The lithium can be alloyed with other metals, such as aluminum, to provide the desired cell electrical performance. When the anode is a solid piece of lithium, a separate current collector within the anode is generally not used, since the lithium metal has a very high electrical conductivity. However, a separate current collector can be used to provide electrical contact to more of the remaining lithium toward the end of cell discharge. Copper is often used because of its conductivity, but other conductive metals can be used as long as they are stable inside the cell.

An anode for a lithium ion cell includes one or more lithium-intercalable materials (capable of insertion and deinsertion of lithium ions into their crystalline structure). Examples of suitable materials include, but are not limited to carbons (e.g., graphitic, mesophase and/or amorphous carbons), transition metal oxides (e.g., those of nickel, cobalt and/or manganese), transition metal sulfides (e.g., those of iron, molybdenum, copper and titanium) and amorphous metal oxides (e.g., those containing silicon and/or tin). These materials are generally particulate materials that are formed into the desired shape. Conductive materials such as metal, graphite and carbon black powders may be added to improve electrical conductivity. Binders may be used to hold the particulate materials together, especially in cells larger than button size. Small amounts of various additives may also be used to enhance processing and cell performance. The anode generally includes a current collector; copper is a common choice. The current collector may be a thin metal foil sheet, a metal screen, an expanded metal or one or more wires. The anode mixture (active material and other ingredients) can be combined with the current collector in any suitable manner. Coating and embedding are examples.

Because lithium and lithium alloy metals are typically highly conductive, a separate current collector within the anode is often unnecessary in lithium and lithium alloy anodes. When an anode current collector is required, as is often the case in lithium ion cells, the current collector can be made from a copper or copper alloy metal.

A cathode for a lithium cell contains one or more active materials, usually in particulate form. Any suitable active cathode material may be used. Examples include FeS$_2$, MnO$_2$, CF$_x$ and (CF)$_n$.

A cathode for a lithium ion cell contains one or more lithium-intercalated or lithium-intercalable active materials, usually in particulate form. Any suitable active lithium-intercalated or lithium-intercalable material may be used, alone or in combination with others. Examples include metal oxides (e.g., those of vanadium and tungsten), lithiated transition metal oxides (e.g., those including nickel, cobalt and/or manganese), lithiated metal sulfides (e.g., those of iron, molybdenum, copper and titanium) and lithiated carbons.

In addition to the active material, a cathode for a lithium or lithium ion cell often contains one or more conductive materials such as metal, graphite and carbon black powders. A binder may be used to hold the particulate materials together, especially for cells larger than button size. Small amounts of various additives may also be used to enhance processing and cell performance.

A cathode current collector may be required. Aluminum is a commonly used material.

Any suitable separator material may be used. Suitable separator materials are ion-permeable and electrically non-conductive. They are generally capable of holding at least some electrolyte within the pores of the separator. Suitable separator materials are also strong enough to withstand cell manufacturing and pressure that may be exerted on them during cell discharge without tears, splits, holes or other gaps developing. Examples of suitable separators include microporous membranes made from materials such as polypropylene, polyethylene and ultrahigh molecular weight polyethylene. Preferred separator materials for Li/FeS$_2$ cells include CELGAFD® 2400 microporous polypropylene membrane (from Celgard Inc., Charlotte, N.C., USA) and Tonen Chemical Corp.'s Setella F20DHI microporous polyethylene membrane (available from ExxonMobile Chemical Co, Macedonia, N.Y., USA). A layer of a solid electrolyte or a polymer electrolyte can also be used as a separator.

Electrolytes for lithium and lithium ion cells are nonaqueous electrolytes. In other words, they contain water only in very small quantities (e.g., no more than about 500 parts per million by weight, depending on the electrolyte salt being used) as a contaminant. Suitable nonaqueous electrolytes contain one or more electrolyte salts dissolved in an organic solvent. Any suitable salt may be used, depending on the anode and cathode active materials and the desired cell performance. Examples include lithium bromide, lithium perchlorate, lithium hexafluorophosphate, potassium hexafluorophosphate, lithium hexafluoroarsenate, lithium trifluoromethanesulfonate and lithium iodide. Suitable organic solvents include one or more of the following: dimethyl carbonate, diethyl carbonate, methylethyl carbonate, ethylene carbonate, propylene carbonate, 1,2-butylene carbonate, 2,3-butylene carbonate, methyl formate, γ-butyrolactone, sulfolane, acetonitrile, 3,5-dimethylisoxazole, n,n-dimethyl formamide and ethers. The salt/solvent combination will provide sufficient electrolytic and electrical conductivity to meet the cell discharge requirements over the desired temperature range. While the electrical conductivity is relatively high compared to some other common solvents, ethers are often desirable because of their generally low viscosity, good wetting capability, good low temperature discharge performance and good high rate discharge performance. This is particularly true in Li/FeS$_2$ cells because the ethers are more stable than with MnO$_2$ cathodes, so higher ether levels can be used. Suitable ethers include, but are not limited to acyclic ethers such as 1,2-dimethoxyethane, 1,2-diethoxyethane, di(methoxyethyl)ether, triglyme, tetraglyme and diethyl ether; and cyclic ethers such as 1,3-dioxolane, tetrahydrofuran, 2-methyl tetrahydrofuran and 3-methyl-2-oxazolidinone.

Specific anode, cathode and electrolyte compositions and amounts can be adjusted to provide the desired cell manufacturing, performance and storage characteristics.

The invention is particularly useful for cells having electrolyte solvents with a very high level (e.g., a total of at least 80 volume percent) of ethers with very low boiling points (e.g., no greater than 90° C.). The advantage is even greater when the volume percent of ethers in the solvent is at least 90 percent, and even more so with at least 98 volume percent ethers in the solvent.

The cell can be closed and sealed using any suitable process. Such processes may include, but are not limited to, crimping, redrawing, collecting and combinations thereof. For example, for the cell in FIG. 1, a bead is formed in the can after the electrodes and insulator cone are inserted, and the gasket and cover assembly (including the cell cover, contact spring and vent bushing) are placed in the open end of the can. The cell is supported at the bead while the gasket and cover assembly are pushed downward against the bead. The diameter of the top of the can above the bead is reduced with a segmented collet to hold the gasket and cover assembly in place in the cell. After electrolyte is dispensed into the cell through the apertures in the vent bushing and cover, a vent ball is inserted into the bushing to seal the aperture in the cell cover. A PTC device and a terminal cover are placed onto the cell over the cell cover, and the top edge of the can is bent inward with a crimping die to hold retain the gasket, cover assembly, PTC device and terminal cover and complete the sealing of the open end of the can by the gasket.

The above description is particularly relevant to FR6 type cylindrical Li/FeS$_2$ cells with nonaqueous electrolytes and to pressure relief vents comprising a thermoplastic bushing and vent ball. However, the invention may also be adapted to other types of cells, such as non-cylindrical (e.g., prismatic) cells, cells with other active materials, cells with other electrolyte solvents (e.g., water) and cells with other pressure relief vent designs. For example, the aperture and pressure relief vent can be located in a cell cover or the container. The aperture can be defined by a uniform opening, such a straight cylindrical opening, or it may be nonuniform, with a reduced diameter opening in one section, such as the aperture in the cell cover in FIG. 1. The seal member sealing the aperture in the housing can be a thermoplastic plug, or it can be a bushing into which a plug is inserted. The plug can be of any suitable solid shape, including but not limited to, a sphere, an ellipsoid, an ovoid and a cylinder. Cells according to the invention can have spiral wound electrode assemblies such as that shown in FIG. 1, another electrode configuration, such as folded strips, stacked flat plates, bobbins and the like.

The invention and its features and advantages are further illustrated in the following examples, which show work that was done to find an improved vent bushing material as a substitute for TEFZEL® HT2185, for use in FR6 type cylindrical Li/FeS$_2$ cells. An improved bushing would result in a better seal, as evidenced by reduced electrolyte loss when cells made with the bushings were exposed to temperature extremes of 75° C. and −40° C. The desired electrolyte contained a high level of highly volatile (low boiling point) ether solvents, susceptible to greater electrolyte loss than less volatile electrolytes.

Example 1

FR6 type cells were made according to FIG. 1 and the above description. The cells had the following features (quantitative values are design averages):

can material—diffusion annealed, low carbon, aluminum killed, SAE 1006 steel; ASTM 9 to 11 grain size, equiaxed to slightly elongated shape; nickel plated; about 0.010 inch (0.254 mm) thick, to provide a 0.0095 inch (0.241 mm) thick can wall     cell cover material—0.013 inch (0.330 mm) thick type 304 soft annealed stainless steel; ASTM 8-9 grain size; post-plated with nickel     cell cover CTE—$1.72 \times 10^{-5}$ percent per degree C.

cell cover vent well inside diameter—0.105 inch (2.67 mm)

gasket material—PRO-FAX® 6524 polypropylene gasket wall thickness—0.0205 inch (0.521 mm)

gasket sealant material—EPDM with 56% ethylene and 9% diene     gasket compression—about 32 percent of the initial gasket wall thickness     vent ball material—440 C stainless steel (per ASTM A276)

vent ball surface finish—3 microinches (0.0762 μm) RMS max.

vent ball sphericity—0.0001 inch (0.00254 mm) max.

vent ball CTE—$1.02 \times 10^{-5}$ percent per degree C.

vent ball diameter—0.090 inch (2.29 mm)

electrolyte composition—9.14 wt % LiI solute in a solvent blend of 63.05 wt % 1,3-dioxolane, 27.63 wt % 1,2-dimethoxyethane and 0.18 wt % 3,5-dimethylisoxazole     electrolyte quantity—1.6 g     cell internal void volume—10 percent vent bushing material—ETFE with no filler (TEFZEL® HT2185)
vent bushing wall thickness—0.0115 inch (0.292 mm)
vent bushing compression—about 32 percent of the bushing wall thickness Samples of both undischarged and fully discharged FR6 cells were tested on a thermal shock test. The fully discharge cells were prepared by continuously discharging at 200 mA to a discharge voltage of 0.5 volt. In the thermal shock test, cells were stored for 6 hours at 75° C., followed by storage for 6 hours at −40° C.; this was repeated 10 times, with no more than 30 minutes between the test temperature extremes. After temperature cycling the cells were stored for 24 hours at room temperature. Each cell tested was weighed before and after testing to determine the total weight loss, including weight loss around and through the vent bushing as well as weight loss around and through the gasket. Each cell was also examined to determine if the cell had vented during the test. Sixteen percent of the undischarged cells and 58 percent of the fully discharged cells vented during the test. Of the cells that did not vent, the average weight loss during the test attributed to the vent bushing was about 23.7 mg for the undischarged cells and about 1.7 mg for the fully discharged cells.

Example 2

Other thermoplastic materials were considered as possible substitutes for ETFE to make vent bushings for the FR6 cells in Example 1.

Table 1 shows CTE, HDT and mold shrinkage characteristics provided by suppliers of a number of thermoplastic materials. For the materials in Table 1, the CTE and HDT values for the glass filled resins are generally more suitable than those for unfilled resins for use in making seal members. The electrolyte transmission rates through unfilled ETFE and PBT are similar, and adding 15-25 weight percent glass filler to these resins can substantially reduce the electrolyte vapor transmission rate at high storage temperatures. Other material properties can also affect the vapor transmission rate, as evident in comparing the results for VALOX® DR51 and LNP WF1004M.

Figure 2:
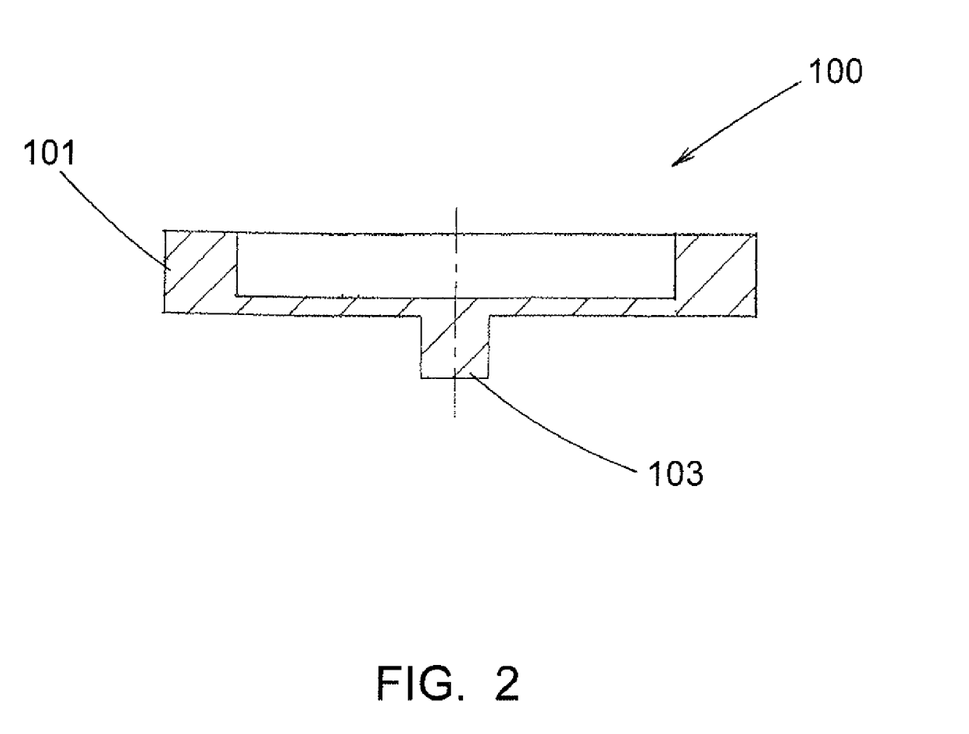
FIG. 2 is a cross-sectional view of a test membrane for a vapor transmission rate test.

Table 2 shows the vapor transmission rates of water and the desired organic electrolyte (9.14 wt % LiI solute in a solvent blend of 63.05 wt % 1,3-dioxolane, 27.63 wt % 1,2-dimethoxyethane and 0.18 wt % 3,5-dimethylisoxazole) through a number of thermoplastic materials at different temperatures. The vapor transmission rates were determined using the following method, adapted from ASTM E96-80 (Standard Test Method for Water Vapor Transmission of Materials):

1. mold a thermoplastic test membrane according to the membrane 100 in FIG. 2, where the height, outside diameter and inside diameter at wall 101 are suitable for providing a seal between the bottle and seal in steps 2 and 5 below, the membrane thickness between wall 101 and hub 103 is 0.020 inch (0.508 mm) and the test surface area (step 9 is the surface area of the membrane between wall 101 and hub 103 [for the serum bottle and seal described in the examples in steps 2 and 5 below, a suitable test membrane has a wall outside diameter of 0.770 inch (19.56 mm), a wall inside diameter of 0.564 inch (14.33 mm), a hub diameter of 0.127 is inch (3.23 mm), a hub length of 0.075 inch (1.91 mm) below the lower test surface and a test surface area of 0.237 in.$^2$ (1.529 cm$^2$)];
2. put about 8 ml of liquid (water or electrolyte) into a 15 ml bottle (e.g., Wheaton Serum Bottle, 25 mm diameter×54 mm high, Cat. No. 06-406D);
3. apply sealant (e.g., G. E. Silicone II for testing at up to 60° C.; vacuum grease for testing at up to 75° C.) to the lip of the bottle;
4. place the test membrane over the top of the bottle;
5. place a seal with a ⅝ inch (15.88 mm) diameter center hole (e.g., Wheaton Aluminum Seal Cat. No. 060405-15) over the test membrane and crimp the seal tightly onto the bottle;
6. weigh the sealed bottle;
7. store the bottle at the desired test temperature and reweigh (at room temperature) at regular intervals (e.g., monthly for 6 months at room temperature; daily for 2 weeks at 60° C. and 75° C.);
8. determine the total weight loss (use a negative value to indicate a weight gain) over the test period;

TABLE 1

| Base Resin | Glass Filler (wt. %) | length (μm) | Thermoplastic Material Grade | CTE (% × 10$^{-5}$ per ° C.) | HDT at 264 psi (° C.) | Mold Shrinkage (in./in. × 10$^{-3}$) (flow direction) | (transverse direction) |
|---|---|---|---|---|---|---|---|
| EFTE | 0 | — | TEFZEL® HT2185 | 9.3 | 74 | 12 | 28 |
| EFTE | 16 | 73$^§$ | LNP FP1004M | | 107 | | |
| EFTE | 25 | 290$^†$ | TEFZEL® HT2004 | 1.7 | 210 | 10 | 18 |
| PBT | 0 | — | VALOX® 310 | 14 | 54 | 19 | 20 |
| PBT | 0 | — | VALOX® 365 | 7.9 | 121 | 12 | 14 |
| PBT | 15 | 548$^†$ | VALOX® DR51 | 2.2 | 191 | 6 | 11 |
| PPS | 40 | | RYTON® R-4-230NA | 1.5 | 260 | | |

$^§$ = milled fibers
$^†$ = chopped fibers 9. calculate the vapor transmission rate in g·0.001 in./day·100 in.$^2$ (g 0.0254 mm/day·0.65416 cm$^2$) using the average total weight loss from step 8 (excluding any individual samples that are extremely high due to loss of seal) and the formula [(ave. weight loss in grams/day)(membrane thickness in inches/1000)(100)/(test surface area of membrane)], where day=24 hours; and 10. perform steps 2-9 on an empty bottle, and correct the calculated vapor transmission rate for the test liquid by subtracting the result from step 9 for the empty bottle from the result from step 9 for the bottle containing the test liquid.

TABLE 2

| Base Resin | Glass Filler (wt. %) | avg. length (μm) | Thermoplastic Material Grade | Vapor Transmission Rate (g · 0.0254 mm/day · 0.65416 cm$^2$) | | | | | |
|---|---|---|---|---|---|---|---|---|---|
| | | | | Water | | | Electrolyte | | |
| | | | | room temp. | 60° C. | 75° C. | room temp. | 60° C. | 75° C. |
| PP | 0 | — | PRO-FAX ® 6524 | 0.2 | 7 | 18 | 8 | 437 | 1394 |
| EFTE | 0 | — | TEFZEL ® HT2185 | 0.6 | 7 | 20 | 6 | 140 | 314 |
| EFTE | 25 | 290 | TEFZEL ® HT2004 | 0.7 | 4 | 13 | 5 | 48 | 173 |
| PBT | 0 | — | VALOX ® 310 | 1 | 11 | 35 | 4 | 129 | 372 |
| PBT | 15 | 548 | VALOX ® DR51 | 1 | 11 | 27 | 7 | 52 | 155 |
| PBT | 16 | | LNP WF1004M | 0.7 | 10 | 28 | 5 | 115 | 312 |

Example 3

Vent bushings were injection molded from TEFZEL® 2185, TEFZEL®HT2004, VALOX® DR51, RYTON® PR09-60 and RYTON® R-4-230NA. The TEFZEL® resins were obtained from E.I. duPont de Nemours & Co. (Wilmington, Del., USA), the VALOX® materials were obtained from G.E. Plastics, General Electric Company (Pittsfield, Mass., USA), the RYTON® materials were obtained from Chevron Phillips Chemical Company, LP (Houston, Tex., USA) and the other materials were custom blended by LNP Engineering Plastics (Exton, Pa., USA). The filled thermoplastic materials were filled with glass fibers. The TEFZEL® HT2185 material contained 75 weight percent regrind. The other materials were 100 percent virgin, with no regrind. The bushings made from RYTON® PR09-60 and R-4-230NA were not acceptable for use in cells. The RYTON® PR09-60 would not properly fill the mold during molding and the bushings molded from the RYTON® R-4-230NA had weak weld lines, indicating that either modification of the resins to improve molding or changes in molding parameters would be necessary in order to produce suitable bushings.

Example 4

Vent bushings from Example 4 made with TEFZEL® 2185, TEFZEL® HT2004 and VALOX® DR51 were used to make FR6 cells that were otherwise like the FR6 cells in Example 1.

Undischarged samples of the FR6 cells were tested on the thermal shock test described in Example 1. The at the cell cover apertures (i.e., through and around the vent bushings are summarized in Table 3.

Those lots with vent bushings made from glass-filled ETFE and PBT had lower average weight losses than lots with bushings made with the unfilled resins. Lot D1 performed the best, with only 0.5 mg of weight loss during the thermal cycling test.

TABLE 3

| Lot | Bushing Material Type | Bushing Material Grade | Ave. Weight Loss (mg) |
|---|---|---|---|
| A1 | Unfilled ETFE | TEFZEL ® 2185 | 38.5 |

TABLE 3-continued

| Lot | Bushing Material Type | Bushing Material Grade | Ave. Weight Loss (mg) |
|---|---|---|---|
| A2 | Unfilled ETFE | TEFZEL ® 2185 | 15.6 |
| B1 | ETFE with 25% Glass | TEFZEL ® HT2004 | 5.5 |
| B2 | ETFE with 25% Glass | TEFZEL ® HT2004 | 4.9 |
| C2 | Unfilled PBT | VALOX ® 365 | 1127.6 |
| D1 | PBT with 15% Glass | VALOX ® DR51 | 0.5 |
| D2 | PBT with 15% Glass | VALOX ® DR51 | 7.2 |

Samples of the FR6 cells were also tested to determine the average vent pressures—at room temperature, at 75° C., and at room temperature following the thermal shock test. The results are summarized in Table 4.

TABLE 4

| Lot | Bushing Material Type | Bushing Material Grade | Vent Pressure [psi (kg/cm$^2$)] | | |
|---|---|---|---|---|---|
| | | | At Room Temp. | At 75° C. | At Room Temp. after Thermal Shock |
| A | Unfilled ETFE | TEFZEL ® 2185 | 846 (59.5) | 596 (41.9) | 199 (14.0) |
| B | ETFE with 25% Glass | TEFZEL ® HT2004 | 955 (67.1) | 775 (54.5) | 315 (22.1) |
| C | Unfilled PBT | VALOX ® 365 | 1175 (82.7) | 757 (53.2) | 462 (32.5) |
| D | PBT with 15% Glass | VALOX ® DR51 | 1170 (82.3) | 926 (65.1) | 1299 (91.3) |

To prevent cell venting under normal operating conditions, FR6 cells made as described in Example should have minimum vent pressures above 100 psi (7.0 kg/cm$^2$) at room temperature and above 135 psi (9.5 kg/cm$^2$) at 75° C. With both ETFE and PBT as the base resin, the addition of glass filler did not result in a substantially lower vent pressure at room temperature, and it increased the average vent pressure at 75° C. and at room temperature following the thermal shock test to provide greater assurance that cells would not vent during storage and normal use.

Although the present invention has been described in considerable detail with reference to certain preferred versions thereof, other versions are possible. Therefore, the spirit and scope of the appended claims should not be limited to the description of the preferred versions contained herein.

Each feature disclosed in this specification (including the accompanying claims, abstract, and drawings) is one example only of a generic series of equivalent or similar features, and each of the features disclosed may be replaced by alternative features serving the same, equivalent or similar purpose, unless expressly stated otherwise.

The invention claimed is:

1. An electrochemical battery cell comprising:
 a housing comprising a metal container with at least one open end and at least a first metal cover disposed in the at least one open end of the container;
 a positive electrode;
 a negative electrode;
 a separator disposed between the positive and negative electrodes;
 a non-aqueous electrolyte having at least one salt dissolved in at least one organic solvent;
 a first thermoplastic seal member, comprising a thermoplastic resin selected from the group consisting of ethylene-tetrafluoroethylene, polybutylene terephthalate, polyphenylene sulfide, polyphthalamide, ethylene-chlorotrifluoroethylene, chlorotrifluoroethylene, perfluoroalkoxyalkane, fluorinated perfluoroethylene polypropylene and polyetherether ketone and more than 10 weight percent of a thermal-stabilizing filler, the first thermoplastic seal member sealing an aperture in at least one of the container and the first cover, thereby forming at least a part of a pressure relief vent for releasing pressure from the cell, wherein said thermal-stabilizing filler decreases the coefficient of thermal expansion of said thermoplastic resin by at least 20 percent and increases the heat deflection temperature of said thermoplastic resin by at least 20° C., wherein the thermal-stabilizing filler is an organic material.

* * * * *